United States Patent [19]

Ghosh et al.

[11] 3,909,563

[45] Sept. 30, 1975

[54] PROCEDURE AND APPARATUS FOR LOCATING FAULTS IN DIGITAL REPEATERED LINES

[75] Inventors: Suhas Ghosh, Naperville; Michael Francis Wicnienski, Joliet, both of Ill.

[73] Assignee: Wescom, Inc., Downers Grove, Ill.

[22] Filed: Nov. 6, 1973

[21] Appl. No.: 413,363

[52] U.S. Cl. .......... 179/175.31 R
[51] Int. Cl.$^2$ .......... H04B 3/46
[58] Field of Search .......... 179/175.31 R, 175.3 R, 179/175.3 F

[56] References Cited

UNITED STATES PATENTS

| | | | |
|---|---|---|---|
| 3,651,284 | 3/1972 | Maione | 179/175.31 R |
| 3,764,760 | 10/1973 | Marchini | 179/175.31 R |
| 3,770,913 | 11/1973 | Camiciottoli et al. | 179/175.31 R |
| 3,842,220 | 10/1974 | Arras | 179/175.31 R |

*Primary Examiner*—Kathleen H. Claffy
*Assistant Examiner*—Douglas W. Olms
*Attorney, Agent, or Firm*—Wolfe, Hubbard, Leydig, Voit & Osann, Ltd.

[57] ABSTRACT

A testing arrangement for remote location of faults in the repeaters of a bipolar communications line in which the number of repeaters to be tested may be at least twice as great as the limited number of test signals usually available in standard test equipment and using only a single fault pair as a return line from all of the repeaters to the central station where the test is made. This multiplication of capability is accomplished by testing the repeaters in sets, a first set being tested using test signals consisting of trains of modified bipolar pulses having respective frequency characteristics in directly usable form. For testing the second set of repeaters each test signal, before being applied to the line, is encoded in the form of a bipolar train of pulses in which the frequency component is present only in coded or disguised form and hence capable of passing to a remote station through the repeaters of the first set without providing any test frequency response. A decoder is provided at the remote station where the signal is converted back to directly usable form with restored frequency characteristics. The decoded signal is fed to the repeaters in the remaining set so that they can be individually tested, in isolation, thus permitting a total of twenty-four repeaters to be tested using the standard set of 12 test signals. Preferably the coding is combined with a set selector signal in the form of a D.C. potential applied to the fault pair to enable only half the number of repeaters to respond at a given time. Where this is done, four sets, or a total of 48 repeaters, may be tested using only 12 test signals.

18 Claims, 6 Drawing Figures

PROCEDURE AND APPARATUS FOR LOCATING FAULTS IN DIGITAL REPEATERED LINES

The invention relates to bipolar digital communications systems, and particularly to means for testing the integrity of the line to assure the necessary quality of transmission. Communication lines of the type involved herein contain a plurality of regenerative repeaters spaced along the line for regenerating and retiming the transmitted signal. One example of this type of system is a T-1 carrier telephone system, where regenerative repeaters are spaced at approximately 1 mile intervals. As the repeaters are generally installed in fairly inaccessible locations, and as the malfunction of a single repeater affects the entire line, procedures have been developed to check the response of repeaters in a line from a central location. These procedures involve use of a test signal generator that produces a standard set of 12 test signals having respectively different frequency characteristics. Moreover, the housings in which repeaters are installed are generally provided with an interrogation filter and usually with a switched amplifier for imposing repeater test responses on a transmission line in the form of a fault pair. A single fault pair is provided for all repeaters in a test circuit and the test responses of all repeaters are bridged across this fault pair. These basic components have been used in various test systems which until now have been limited to testing of up to 24 repeaters, 12 in each of the transmit and receive spans from a central location, using a single fault pair. Thus, it is seen that in relatively long transmission lines a number of central testing locations must be provided in order to completely test all repeaters in the line, or alternatively multiple fault pairs must be provided. In accordance with the invention to be described below used in conjunction with the standard testing components the testing capability from a central location using a single fault pair is effectively doubled.

Accordingly, it is an object of this invention to provide a test circuit for testing existing bipolar digital communications lines with capability to test up to 48 repeaters 24 in each of the transmit and receive spans from a central location using a single fault pair. More particularly, it is an object to provide this capability without the necessity for modifying or adding components to the repeaters to be tested. It is a general object to minimize the number of lines required in a transmission system by achieving maximum utilization of the fault lines in that system.

It is another object to test both transmit and receive lines from the same central location while isolating those lines from each other during test. It is a more specific object to impose test signals on the transmit line in directly usable form, while preventing those signals from affecting the receive line, for transmit line testing; and to encode the test signals into a disguised form for testing the repeaters in the receive line, the signals being decoded to restore the desired frequency characteristics before being applied to the receive line.

It is a further object of the present invention to provide a means for substantially increasing the number of repeaters which can be tested from a central location in an existing system simply and conveniently and at minimum expense. More specifically, using the present invention, it is possible to double the number of repeaters which can be tested without making any substantial modifications in the existing system except for the addition of an encoder module at the central station, and a decoder module at the remote station which thereupon divides the repeaters into sets for isolated testing.

Other objects and advantages will become apparent from the attached detailed description and upon reference to the drawings in which.

While the present invention will be described with reference to certain preferred embodiments, it should be understood that there is no intention to limit the invention to the specific forms disclosed, but on the contrary the intention is to cover all modifications, alternative constructions and equivalents falling within the spirit and scope of the appended claims.

Figure 1:
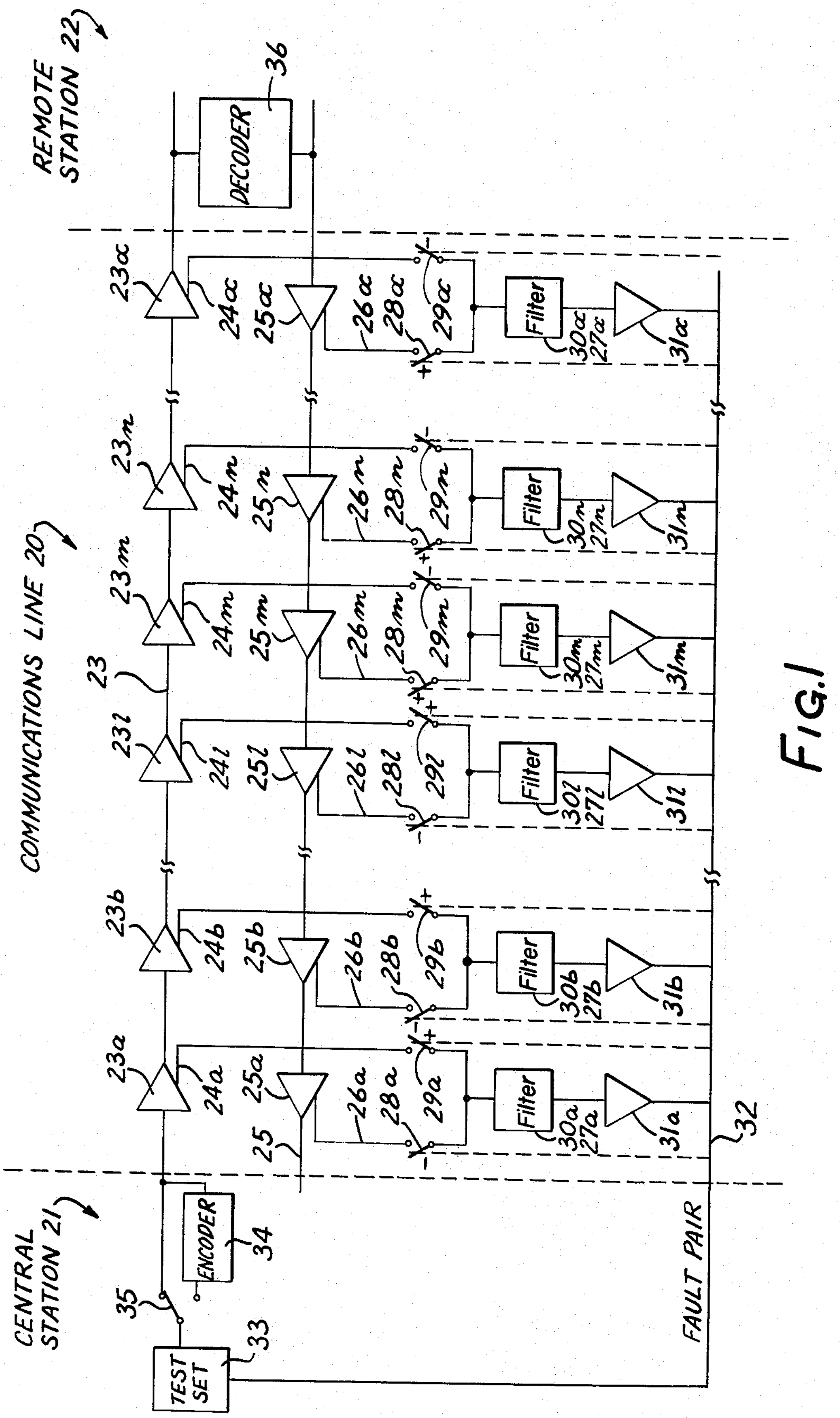
FIG. 1 is a diagram illustrating a communications system or repeatered transmission line arranged for testing in accordance with the teachings of this invention.

Referring now to the drawings, FIG. 1 illustrates a communications line 20 arranged for testing in accordance with the teachings of this invention, formed of a transmit line 23 and a receive line 25, which spans the distance between a central station 21 and a remote station 22. It should be realized that the only equipment illustrated is that used in testing; the additional equipment used during normal communication is not illustrated.

The signals in systems of the type described herein are trains of high frequency digital bipolar pulses, of which the T-1 carrier telephone system provides a common example. In order to maintain the intelligence in these pulse trains and to insure reliable detection of pulses, regenerative repeaters are inserted into the line at intervals for regenerating and retiming of the pulses.

In FIG. 1 it is seen that the transmit line 23 includes a series of twenty-four tandem repeaters, 23*a* to 23*x*, spaced at intervals along the line between the central station and remote station. Likewise, receive line 25 includes a series of 24 tandem repeaters, 25*a* through 25*x*, similarly spaced. In a T-1 carrier telephone system, the repeaters are spaced at approximately 6,000 foot intervals. A communications line containing 24 repeaters in each span has been selected to make use of the maximum capability of the test set used in fault locating T-1 systems, which has but 12 test frequencies available; application to other systems might not be so limited. In a T-1 system, if a line with fewer than 24 repeaters is encountered, it can be tested utilizing the same procedures; if a line with more than 24 repeaters is encountered, it must be broken into sets of no more than 24 repeaters by proper selection of the central and remote stations as will be illustrated below. Alternatively, the testing capability using a single fault pair can be further increased by using an indirect testing scheme wherein only alternate repeaters are directly tested. A fault indication by a directly tested repeater indicates that either it or the untested repeater immediately preceding it is faulty. Both repeaters may then be checked on site.

Various means for remote repeater testing have been devised in order to maintain reliable communication in repeatered lines. Remote testing from a central station is desirable since the repeaters may be spaced a mile or more apart, usually in relatively inaccessible locations. Since the failure or deterioration of a single repeater affects the entire line, the purposes of a testing system is to promptly locate any faulty or marginal repeater so that repairs can be quickly effected to reduce down time and keep the line in an efficient state. To that end, various interrogation components are usually installed at each repeater location and a single fault pair is provided for returning responses to a central testing station. In addition, each repeater is provided with a secondary output shown as 24*a* through 24*x* and 26*a* through 26*x* in FIG. 1. In a T-1 carrier system, this secondary output takes the form of a fault winding, an additional secondary winding on the repeater output transformer. It is usual in communication systems of this sort to install each transmit repeater in close proximity to its associated receive repeater; for example, in T-1 carrier systems, they are installed on the same chassis. Also, in T-1 systems it is common to install up to twenty-four of these two way repeaters in a single housing in conjunction with a switched amplifier and one of a series of interrogation bandpass filters which are shared by all repeaters in the housing. Thus in a T-1 system each repeater location contains provisions for 24 transmit and 24 receive lines, all sharing the same fault pair; however, for simplicity, in the materials that follow only one transmit and one receive line will be considered.

In a manner to be described below, each of the switched amplifiers generally indicated at 27*a* through 27*x* contains a pair of input switches 28 and 29 (illustrated as mechanical switches on FIG. 1) which are responsive to the polarity of the voltage applied to the fault pair from the central station. These switches couple the fault circuits of one of their two associated repeaters to the input of a bandpass filter illustrated at 30. Filters 30*a* through 30*l* constitute a set of 12 bandpass filters responsive to one of the twelve test frequencies used in T-1 systems; filters 30*m* through 30*x* constitute a duplicate set of filters. As illustrated in FIG. 1, any signal present on a repeater fault winding and passed by switches 28 or 29 and further passed by filter 30 is imposed on the input of amplifier 31 where it is amplified and imposed on the fault pair.

Means for remote repeater testing using these general components are well known in the art and have been described in the literature. See for example, Bell System Technical Journal, January, 1962 "A Bipolar Repeater For Pulse Code Signals" by J.S. Mayo, and Bell System Technical Journal, September, 1965 "The T-1 Carrier System" by K.E. Fultz and D.B. Penick. Briefly stated, these systems impose test signals not encountered during normal transmission on the repeatered line and monitor the response of the repeaters via a fault pair.

As mentioned, the signals used in systems of the present type are trains of bipolar digital pulses at pulse rates of, say 1.544 million pulses per second. The pulse train is comprised of pulses separated by a varying number of spaces. However, the bipolar format requires that succeeding pulses, no matter what their spacing, are always of opposite polarity. Any two succeeding pulses of the same polarity are termed a bipolar violation, an occurrence not normally encountered in a properly functioning line. Thus, any normal bipolar pulse train will contain as many positive pulses as negative pulses so that the signal can have no sensible frequency characteristics in the audio band. By intentionally incorporating periodic bipolar violations, however, a pulse train may be given a directly sensible frequency component at a frequency well below the line bit rate. This low frequency signal may be used for testing a particular repeater.

Figure 2:
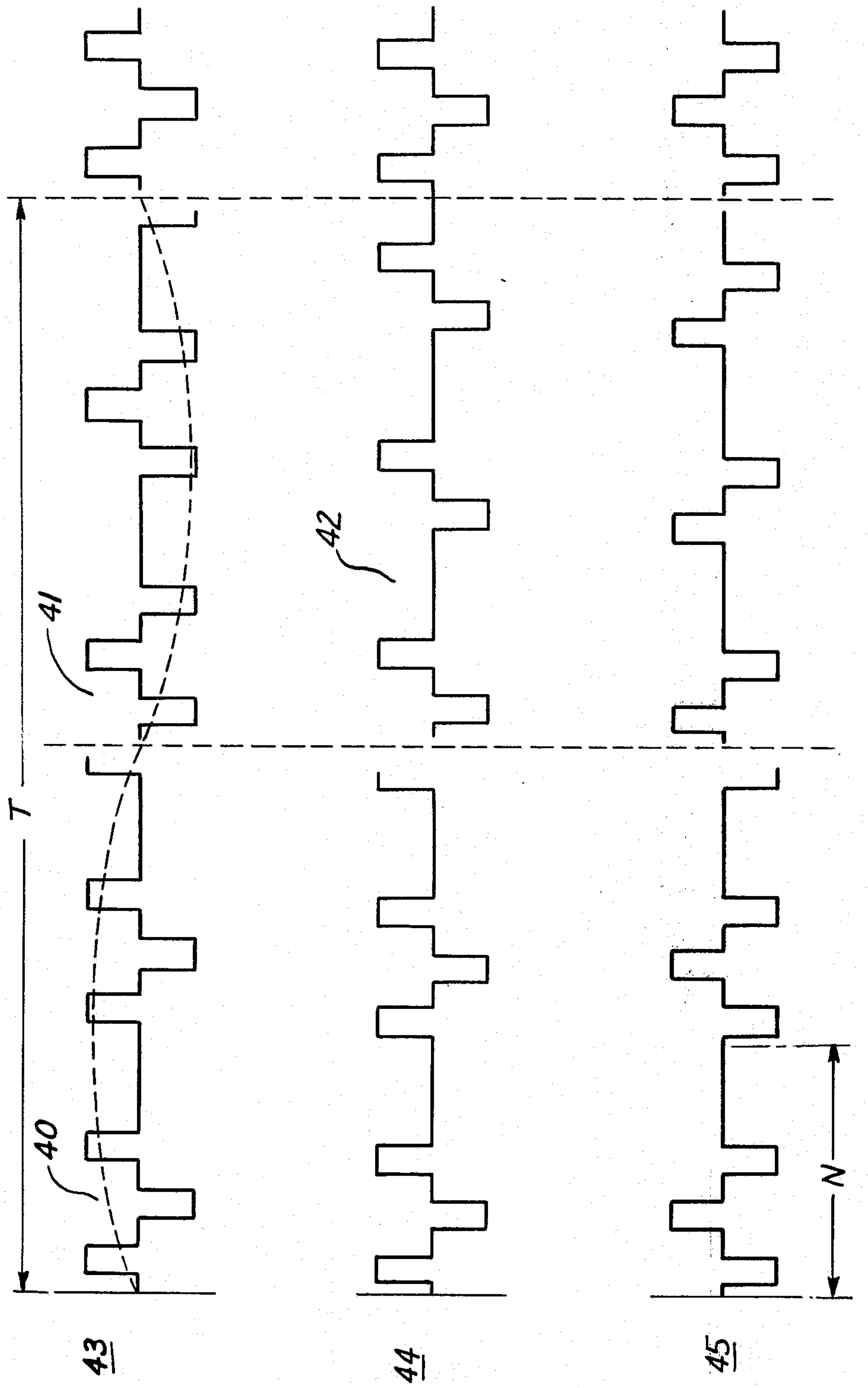
FIG. 2 is a diagram illustrating the various test wave forms utilized.

The types of test signals utilized are illustrated in FIG. 2. Bipolar violations are brought about by using "trios" of pulses. A positive trio, as illustrated at 40, is a group of three pulses, the first and third of which are positive and the second of which is negative. It is seen that succeeding positive trios cause a series of positive bipolar violations. Negative trios are illustrated at 41 and are seen to be groups of three pulses, the first and third of which are negative and the second of which is positive. Accordingly, a series of negative trios causes a series of negative bipolar violations. True bipolar pulses are illustrated at 42, for comparison, and it is seen that these pulses cause no bipolar violations. Three pulse patterns are utilized in repeater testing, the first of which is illustrated at 43 and is seen to be positive trios alternating with negative trios. Pattern 44 illustrates positive trios alternating with bipolar pulses while pattern 45 illustrates negative trios alternating with bipolar pulses.

As is more fully discussed in the aforementioned literature, two variables are available in generating these series of test signals. The first is the pattern period illustrated by T, the frequency intelligence in the signal being diagrammatically illustrated by the dotted line in pattern 43. In a T-1 carrier system, this period is variable in 12 steps falling within the audio range to provide twelve test signals, the characteristic frequencies of which correspond to the frequencies of the 12 bandpass filters. When a signal containing one of the pulse patterns described above is regenerated by a repeater, the output of that repeater contains a relatively strong audio frequency component corresponding to the pattern reversal rate 1/T. The second variable available in the test patterns is the trio density or the number of trio patterns in a given number of time slots N. Increasing the density of trio patterns causes the audio frequency component described above to increase in amplitude. However, increasing the density of trio patterns also makes it more difficult for a repeater to regenerate the test signal. Therefore, the effectiveness of a repeater is tested by imposing on it a test pattern whose reversal rate corresponds to its associated bandpass filter. The trio density is increased and the returned audio level is measured at the central station via the fault pair to assure that the returned audio level increases in correspondence to the increase in trio density, thereby yielding a figure of merit for each repeater.

It will be appreciated that the object of repeater testing utilizing these means is to isolate each repeater for test purposes. It should be further appreciated that when a test signal is imposed on a repeatered line, all operational repeaters in that line will respond to the test signal. It is obvious that if two repeaters were allowed to affect the fault pair at any one time, the signal returned from an operational repeater would mask the lack of signal from a faulty repeater, making it impossible to be certain that both repeaters were functioning. Therefore, means are used to impress the response of only one repeater on the fault pair at any given time.

Referring again to FIG. 1, a testing means capable of achieving this isolation will be demonstrated. There is seen a central station 21 at which is located a commercially available test set 33 capable of generating the 12 test signals described above. Switch 35 when placed in the position illustrated, connects the output of the signal generator directly to the transmit line. In order to test the receive line from the same central location, prior art systems employed an automatic loopback module (not illustrated, but placed at the righthand end of the figure). Such module sampled the signal on the transmit line and imposed that signal directly on the receive line when pulse patterns containing numerous bipolar violations were recognized. Thus, in prior art systems, the signal from the signal generator would be imposed on all transmit repeaters 23*a* through 23*x* and all receive repeaters 25*a* through 25*x* simultaneously, causing all repeaters under test to contain a frequency component in their output equal to the reversal rate of the test pattern. It is recalled that the set of filters 30*a* through 30*l* is identical to the set 30*m* through 30*x*. Assuming, for example, that the pattern reversal rate from the test set corresponds to the frequency of filters 30*a* and 30*m* and further assuming that there is a positive polarity imposed on the fault pair, it is seen that using prior art means, the response of repeaters 23*a* and 25*m* would be simultaneously imposed on the fault pair, which would allow the response of an operational repeater to mask the potentially faulty response of the second repeater. To prevent such masking, two fault pairs are required in a prior art system to test 48 repeaters, one pair for repeaters *a* through *l*, and the second pair for repeaters *m* through *x*. As the purpose of pulsed communication systems is to minimize the total number of conductors, having to provide double the number of fault lines is somewhat self defeating.

In accordance with the invention, the simple automatic loop back module described above is dispensed with. Instead, an encoding device 34 is provided at the central station for encoding the test signals, in which the frequency characteristics are directly usable for test purposes, into a bipolar format in which the test frequency intelligence is disguised so that the repeaters in the transmit line are rendered non-responsive. In addition, a decoder 36 is provided between the lines at a remote location (remote station) for reconstructing the test signals, complete with their respective frequency characteristics, and imposing the reconstructed signal on the receive line, so that the repeaters in the receive line may be individually responsive. The decoder, unlike the loop back module, responds only to the encoded signal and thereby provides selective isolation of the transmit and receive repeaters for test purposes. Isolated testing of the transmit line is accomplished as follows: The signal from the test set is applied directly to the transmit line via switch 35. A positive polarity is imposed on the fault pair thereby closing all switches 29*a* through 29*x*. It is seen that imposition of this polarity is an "enabling signal" which causes the fault circuits of transmit repeaters 23*a* through 23*l* and receive repeaters 25*m* through 25*x* to be imposed on the inputs to their corresponding bandpass filters. But as no test signal is imposed on the receive line, because the decoder is not activated, it is seen that repeaters 25*m* through 25*x* cannot affect the fault pair. The test signal with the audio frequency characteristic corresponding to filter 30*a* is imposed on the transmit line and the response of repeater 23*a* is measured on the fault pair. It is seen that bandpass filters 30*b* through 30*l* prevent repeaters 23*b* through 23*l* from affecting the fault pair. Thus, repeater 23*a* is isolated for testing. Repeaters 23*b* through 23*l* are tested in the same manner by sequentially altering the test signal to include frequency characteristics corresponding to filters 30*b* through 30*l*. After repeater 23*l* is tested, the polarity on the fault pair is reversed thereby selecting the alternate set of filters by closing of all switches 28*a* through 28*x*. In a manner similar to that described above, each repeater 23*m* through 23*x* is individually tested by selecting the proper frequency to be generated by the test set. After the transmit line is completely tested, switch 35 is put into its alternate position, which imposes the test signal on encoder 34 which in turn couples its encoded output signal onto the transmit line. Encoder 34 which will be described in more detail below, generates a coded signal in response to the test signal which contains sufficient intelligence to allow reconstruction of the original test signal by decoder 36. However, the output signal from encoder 34 is truly bipolar, i.e., the frequency characteristics corresponding to the bandpass filters are disguised so that they do not excite any repeater-filler with the audio-frequency intelligence contained in the test signal. Stated differently, the encoder output signal contains the test signal but not in a directly usable form. This encoded test signal is passed down the transmit span to the decoder 36 located at a remote station. As will be further described below, the decoder recognizes the encoded signal and from that signal reconstructs the original test signal. Also in response to reception of this coded signal, the decoder closes a circuit which imposes the reconstructed and directly usable decoded test signal on the receive span. It should be appreciated that while the transmit line is used to transmit this coded test signal, the fact that the test signal is not in directly usable form prevents the transmit repeaters from having any effect on the fault pair. Thus, the receive line is isolated from the transmit line for testing purposes. In a manner similar to testing of the transmit line, imposing the proper polarity or set selector signal on the fault pair and generating the proper test signals allows isolated testing of each of the receive repeaters.

Thus, it can be seen that utilizing the means described herein the testing capability for a single fault pair has been effectively doubled. It should be further appreciated that the remote station defined by decoder 36 can be located anywhere in the communication line. As the decoder requires no manual adjustment once installed, and as the decoder is generally ineffective to couple a signal onto the receive line during normal transmission, accessibility is unnecessary and it can be allowed to remain in the circuit without any adverse effect on normal operation of the transmission line. Many of the elements used in the testing means described are components which have long been used in testing systems. This allows the novel testing means described to be utilized in existing systems. However, three elements, i.e., the switched amplifier, the encoder and the decoder, require further description.

Figure 3:
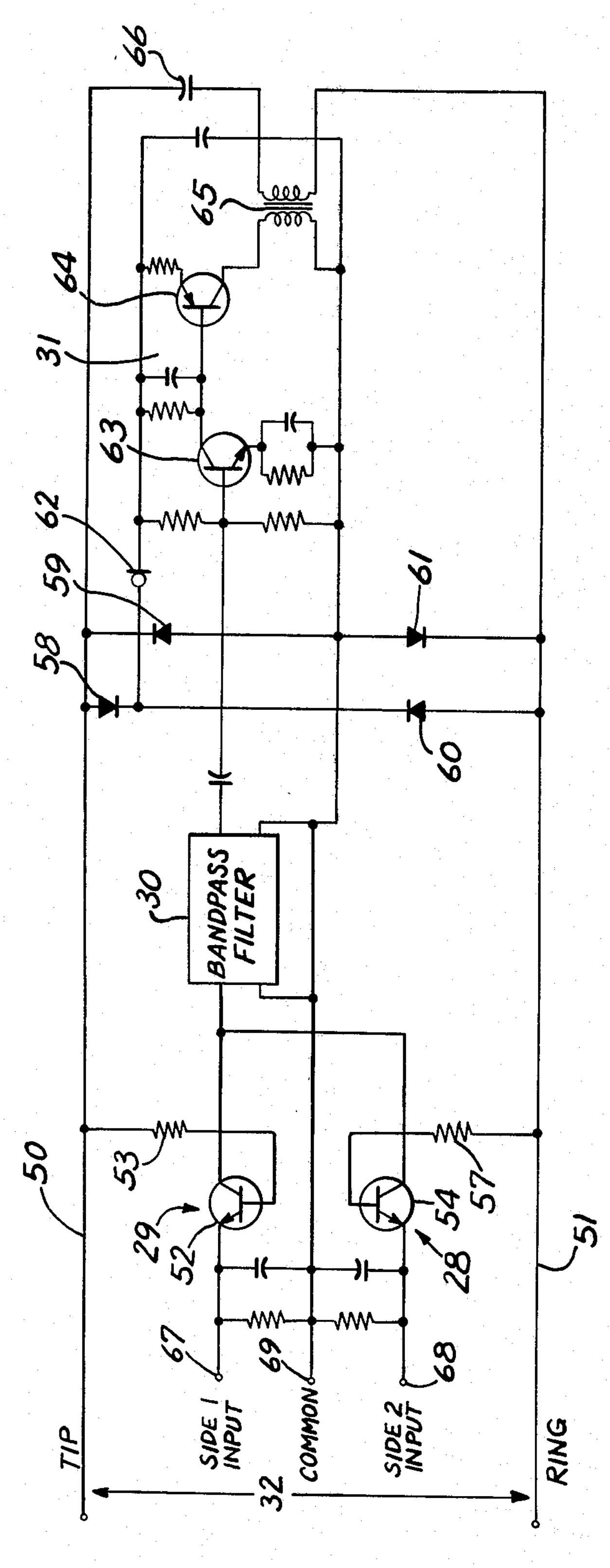
FIG. 3 is a schematic diagram of a switched amplifier.

The switched amplifier will be described with reference to FIG. 3, which shows input switches 28 and 29, bandpass filter 30 and amplifier 31. The fault pair 32 includes a tip conductor 50 and a ring conductor 51. It is seen that with the tip conductor positive with respect to the ring conductor, a positive polarity is maintained on the base of transistor 52 via resistor 53, allowing that transistor to conduct. In addition, transistor 54 is maintained in the off condition by a negative potential supplied through diode 61 and resistor 57. When the polarity on the fault pair is reversed, transistor 54 is allowed to conduct via resistor 57 while transistor 52 is cut off via diode 59 and resistor 53. Inputs 67 and 68 are coupled to the respective fault windings of their associated repeaters while common input 69 is coupled to the common connection of those repeaters. Thus, positive polarity applied to the fault pair is an enabling signal for transistor 52, which is allowed to conduct, thereby imposing the signal at input 67 onto the input of the bandpass filter 30. Transistor 54 appears to be an open circuit, which prevents the signal on input 68 from affecting the bandpass filter. In like manner when the polarity on the fault pair is reversed, the signal on input 68 is coupled to the bandpass filter while the signal on input 67 is blocked. The output of the bandpass filter is imposed on amplifier 31. This amplifier derives its power through diodes 58 through 61 arranged in bridge rectifier configuration. These diodes are arranged so that power supplied to the amplifier is always of the same polarity. It is seen that with the tip conductor positive with respect to the ring conductor diodes 58 and 61 are forward biased to provide power to the amplifier while diodes 59 and 60 are reverse biased. Similarly with the tip line negative with respect to the ring line, diodes 59 and 60 are forward biased to provide power to the amplifier while diodes 58 and 61 are reverse biased. It has been found necessary when utilizing switched amplifiers in the expanded testing system described herein to limit the power consumption of the amplifiers. To that end, the amplifiers are current fed through a current regulating diode 62 to restrict the total current consumption to 0.5 ma. This makes it possible to power 24 amplifiers using No. 22 or heavier gauge pairs from the regulator 48-volt station battery. It is also seen that the output from bandpass filter 30 is coupled to the input of amplifier 31 where it is amplified by transistors 63 and 64 and their related components using standard techniques and then coupled via transformer 65 and capacitor 66 onto the fault pair. 32.

Before the circuitry of the encoder and decoder is described in detail, their general purpose and function should be understood. As described above, it is the purpose of the encoder to accept the test patterns from the signal generator and recode them in truly bipolar form so that they are not directly usable as a test signal. The decoder then must accept this coded signal and reconvert it into directly usable form and further impose this reconverted signal on the receive line. It is seen, therefore, that the information which must be included in the coded signal is the original pulse position, the type of pattern of the original signal (e.g. positive trios) and the point at which the patterns reverse. The encoder accomplishes this in the following way. It maintains the original pulse position of each input pulse, although it reverses the polarity of some of the pulses in order to provide a true bipolar output. Therefore, trio patterns will be groups of three pulses while bipolar patterns will be groups of two pulses. In addition, the encoder overwrites on its output pulse train 10 consecutive 1's each time the test pattern contains a transition to positive trios or from negative trios. It also overwrites 10 consecutive 0's on the output pulse train each time the test pattern contains a transition to negative trios or from positive trios. This information is sufficient to allow the decoder to reconstruct the original usable test signal. In addition, it is recalled that the pattern reversal rate of the test signal is at an audio frequency. It is, therefore, seen that the 10 1's and 10 0's described above will occur on the output pulse stream at an audio rate. The decoder is responsive to this reasonably frequent occurrence of 10 1's followed by 10 0's and in response thereto couples the output signal from the decoder onto the receive line. This condition will not be encountered during normal transmission, which thereby prevents the decoder from having any effect on the receive span during normal use. That is, the probability of the line signal in normal traffic having 10 consecutive 1's is fairly high, but the probability of 10 consecutive 0's is extremely low.

Figure 4:
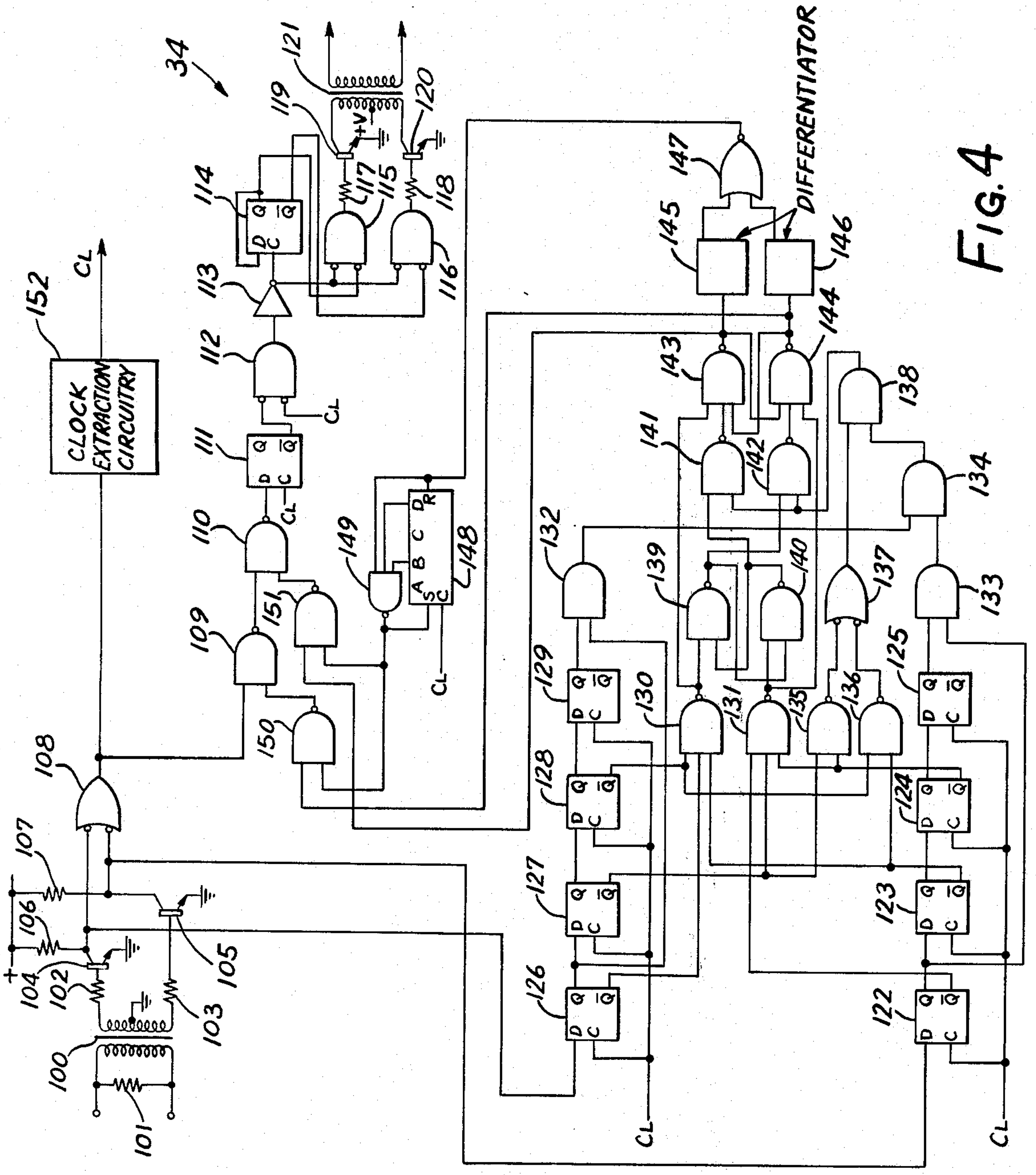
FIG. 4 is a logic diagram for the encoder circuitry.

The mode of operation of the preferred embodiment of the encoder circuitry will be described with reference to FIG. 4. It should be realized that certain of the circuitry utilized such as NAND gates and flip flops are well known to those in the art and therefore will be described only functionally. It should be noted in the drawings that two representations are used to illustrate NAND gates depending on their logical use. That is, a NAND gate can be described as one which generates a low output if and only if all its inputs are high, or alternatively as one which generates a high output when any of its inputs are low. Similarly, two representations are used for NOR gates depending on their logical use: a gate which generates a low output when any of its inputs are high, or one which generates a high output if and only if all its inputs are low.

The test patterns from the signal generator are coupled to the primary of transformer 100 which has resistor 101 connected across the primary to act as a terminating load. The center tap of the secondary winding of transformer 100 is grounded while the two outer terminals are coupled through resistors 102 and 103 to the bases of transistors 104 and 105 respectively. Transistors 104 and 105 are arranged to act as switching elements with their emitters connected to ground and their collectors connected through resistors 106 and 107 respectively to a suitable supply of DC voltage. A positive input pulse on transformer 101 will cause current flow through the upper half of the secondary into the base of transistor 104, turning it on and causing its collector to go to ground. Transistor 105 is turned on by a negative input pulse, which causes current flow through the lower half of the secondary winding to its base causing its collector to go to ground. The collectors of transistors 104 and 105 are coupled to the inputs of two-input NAND gate 108. It should therefore be appreciated that the output of NAND gate 108 is a train of positive unipolar pulses which are essentially a rectified version of the bipolar input signal. The output of gate 108 is fed into clock extraction circuitry 152. The form of this circuitry is well known as it is identical to the circuitry used in the repeater, one form of which has been described in Bell System Technical Journal, January, 1962 "A Bipolar Repeater For PCM Signals" by J.S. Mayo. Suffice it to say that the circuitry generates a clock signal whose frequency corresponds to the bit rate and which is locked in phase with the incoming signal. This clock signal is utilized at various points in the circuitry as will be described below.

It has been shown that the output of gate 108 contains a positive pulse for every input from the test set, no matter if that input pulse is positive or negative. The means by which these pulses are processed by the encoder and output in true bipolar format will now be illustrated. NAND gates 150 and 151 are enabling gates in the test signal path and their outputs are normally maintained high except in conditions to be described below. This allows NAND gates 109 and 110 to pass the pulses received from gate 108. Therefore, the signal from gate 108 is doubly inverted by gates 109 and 110 and appears at the output of gate 110. The output of gate 110 is coupled to the D input of flip flop 111. In the presence of a clock signal, that input signal is transferred to the Q output of flip flop 111. The $\overline{Q}$ output, which contains the inverse of the Q output, is coupled to one input of NOR gate 112, the other input being driven by the clock signal. The output of NOR gate 112 corresponds to the unipolar pulse train at the output of gate 108 but has been retimed by the clock signal to cause the pulse excursions to occupy only one-half of the bit width as required by the transmission system. This retimed unipolar pulse train is inverted by inverter 113 and applied to the clock input of flip flop 114, connected to divide by 2, and also to one of the inputs of each of NOR gates 115 and 116. It is seen that gate 115 is enabled by the Q output of flip flop 114 while gate 116 is enabled by the $\overline{Q}$ output of flip flop 114. As the Q and $\overline{Q}$ outputs of the flip flop must always be in opposite states, only one of these gates can be enabled at any given time. It is further seen that any pulse at the output of inverter 113 (which it is recalled has been caused by a positive pulse at the output of gate 108) will cause the flip flop to change states. Therefore it is seen that gates 115 and 116 are enabled alternately for each succeeding output pulse. It is further appreciated that the lack of an output pulse or a logic 0 in the pulse train will not cause flip flop 114 to change state. The output of gate 115 is coupled through resistor 117 to the base of transistor 119. Similarly, the output of gate 116 is coupled through resistor 118 to the base of transistor 120. The emitters of these transistors are grounded and the collectors are coupled to a suitable positive supply of DC voltage through opposite halves of the center tapped primary of transformer 121. It should therefore be appreciated that due to the cooperative action between flip flop 114 and NOR gates 115 and 116, successive positive pulses at the output of gate 108 will cause transistors 119 and 120 to alternately conduct. As transistors 119 and 120 cause a reversal of current in the primary of transformer 121 the output of the secondary of that transformer will be a bipolar pulse train. In summary, it is seen that the circuitry described thus far has accepted the input signal from the test set, has rectified it to form a unipolar pulse train, has retimed that pulse train and than has output that pulse train in true bipolar form.

Additional logic circuitry is provided to detect the presence of positive trios, negative trios, and bipolar patterns, and further to signal the transition from one pattern to another. This is accomplished as follows. It is recalled that the collector of transistor 104 was driven low for each positive pulse received from the signal generator. These low going pulses are loaded into a shift register comprised of flip flops 126, 127, 128 and 129. Similarly, a shift register comprised of flip flops 122 through 125 accepts the low going pulses from transistor 105 which resulted from negative pulses in the input signal. These shift registers are made up of D type flip flops, wherein the signal present on the D input is transferred to the Q output upon the occurrence of a clock pulse. It is seen that each stage of the shift register is supplied with a clock signal from clock extraction circuitry 152. It is further seen that the D input of each but the first flip flop is coupled to the Q output of the preceding flip flop, thereby causing the circuit to operate as a right shift register.

The detailed operation of the circuit is as follows. A positive bipolar pulse will cause transistor 104 to conduct, thereby imposing a 0 on the D input of flip flop 126. That positive pulse will also cause the clock extraction circuitry to generate a clock pulse which is applied to the clock inputs of all flip flops. This combination causes the $\overline{Q}$ output of the flip flop 126 to go high and the Q output to go low. Further, it is seen that transistor 105 must have been maintained off during this time maintaining a logic 1 at the D input to flip flop 122. This logic 1 in conjunction with the aforementioned clock signal causes the Q output of flip flop 122 to go high and its $\overline{Q}$ output to go low. Assuming that the next pulse input from the test set is a logic 0, the following will occur. Both transistors 104 and 105 remain off, thereby imposing a logic 1 on the D inputs to flip flops 122 and 126. The clock extraction circuitry will generate a clock pulse. This will cause the transfer of the signal at the D input to the Q output of both flip flops, causing both Q outputs to go high and both $\overline{Q}$ outputs to go low. However, as the D inputs to flip flops 127 and 123 where coupled to the Q outputs of flip flops 126 and 122 respectively, the information in flip flops 122 and 126 will be transferred to flip flops 123 and 127 respectively. Thus, flip flop 127 will be caused to drive its Q output low and its $\overline{Q}$ output high, while flip flop 123 will be caused to drive its Q output high and its $\overline{Q}$ output low. If a negative bipolar pulse is received from the test set, transistor 105 turns on, imposing a logic 0 on the input to flip flop 122. The clock pulse generated by clock extraction circuitry 152 will then transfer this 0 to the Q output of flip flop 122 while transferring the corresponding 1 input at the D input of flip flop 126 to its Q output. Thus, it is seen that all positive pulses in the bipolar input train are loaded into the shift register defined by flip flop 126 through 129 and further that the presence of a positive pulse exihibits itself as a logic 1 on a corresponding $\overline{Q}$ output. It is also seen that all negative pulses in the input bipolar pulse train are loaded into the shift register defined by flip flops 122 through 125 and further that any negative pulse is indicated by a logic 1 in a corresponding $\overline{Q}$ output of that shift register.

These registers are monitored in the following manner to detect trio patterns. It is recalled that a positive trio pattern will have first and third positive pulses and a second negative pulse. Therefore, a positive trio can be detected by sampling the $\overline{Q}$ outputs of flip flops 126, 128 and 123. The presence of ones in all of those $\overline{Q}$ outputs indicates the presence of a positive trio. This sampling is accomplished by NAND gate 130 whose output goes low whenever a positive trio is loaded into the shift registers. In like manner, the $\overline{Q}$ outputs of flip flops 122, 124, and 127 are monitored by NAND gate 131 and the simultaneous presence of all ones on those outputs drives the output of gate 131 low indicating the presence of a negative trio. It should be appreciated that as each individual pulse is clocked into the shift register the result is the continuous monitoring of each set of any three adjacent pulses.

Bipolar pulses are detected in the following manner: In order to distinguish bipolar pulses from trio patterns the logic circuitry takes advantage of the fact that a bipolar pattern as generated by the test set will be immediately preceded and immediately succeeded by a 0 input pulse. To that end, AND gate 132 monitors the Q outputs of flip flops 126 and 129 and generates a high input whenever both Q outputs are high. Similarly, AND gate 133 monitors the Q output of flip flops 122 and 125 and generates a high output whenever both of those outputs are high. The outputs of AND gates 132 and 133 serve as inputs to AND gate 134 which generates a high signal whenever the signals from both gates 132 and 133 are high. Therefore, it should be appreciated that the output of gate 134 is high whenever there are 0's in both the first and fourth pulse positions. A bipolar pattern will contain pulses of opposite polarity in the second and third positions bracketed by the 0 pulses discussed above. To detect a positive followed by a negative bipolar pulse pattern, NAND gate 136 has its two inputs coupled to the $\overline{Q}$ outputs of flip flops 123 and 128. It is therefore seen that its output will go low whenever a positive followed by a negative pulse is loaded into the proper position in the shift register. Similarly as the inputs of NAND gate 135 are coupled to the outputs of flip flops 124 and 127 the output of that gate will go low when the shift register is loaded with a negative pulse followed by a positive pulse. The output signals of gates 135 and 136 serve as inputs to NAND gate 137 which generates a high signal whenever either of the foregoing conditions are met. This high signal and the output from gate 134 (which generated a high output whenever the bracketing 0 pulses were present) serve as inputs to AND gate 138. It is therefore seen that the output of gate 138 will be high whenever a bipolar pattern is detected. In summary, it can be said that gate 130 generates a low output whenever a positive trio pattern is detected, gate 131 generates a low output whenever a negative trio pattern is detected, and gate 138 generates a high output whenever a bipolar pattern is detected.

These three signals are used in the following way to indicate the transitions between test patterns. It is seen that NAND gates 139 and 140 form a cross coupled latch or flip flop controlled by the outputs of gates 130 and 131. The detection of a positive trio by gate 130 will cause the output of gate 139 to go high and the output of gate 140 to go low. Similarly the detection of a negative trio by gate 131 will cause the output of gate 140 to go high and the output of gate 139 to go low. The outputs from this cross coupled latch in conjunction with the bipolar indicating output of gate 138 serve as inputs to NAND gates 141 and 142. The outputs of gates 141 and 142 and the outputs of gates 130 and 131 serve as inputs to a second cross coupled latch formed of NAND gates 143 and 144.

Transitions between positive and negative trios are detected in the following manner: Initially the absence of bipolar pulses in the input signal will maintain the output of gate 138 low, disabling gates 141 and 142. Thus, the cross coupled latch formed of gates 143 and 144 will be controlled by gates 130 and 131. The detection of a positive trio (which causes the output of gate 130 to go low) will cause the output of gate 143 to go high and the output of gate 144 to go low. The flip flop will remain in this condition as long as only positive trios are detected. When negative trios are detected, the output of gate 131 is driven low, causing the output of gate 144 to go high and gate 143 to go low. The outputs of these gates will remain in that condition until a pattern other than negative trios is detected. Therefore it is seen that the output of gates 143 and 144 form a square wave whose frequency corresponds to the rate of reversal of positive and negative trios.

If the input signal consists of positive trios alternating with bipolar pulses, the following occurs. As described above, the detection of a positive trio causes the output of 143 to go high and the output of 144 to go low. In addition, a 0 output from gate 130 causes the output of gate 139 to go high and 140 low. The output of gate 139 thereby generates an enabling signal for gate 142. When a bipolar pattern is detected, gate 138 generates a high output which satisfies gate 142 driving its output low. This causes the output of gate 144 to go high and the output of gate 143 to go low. Thus, the output of gates 143 and 144 form a square wave which corresponds in frequency to the rate of reversal of positive trios and bipolar pulses.

Transitions between negative trios and bipolar pulses are detected in a similar manner. As described above, negative trios cause the output of gate 144 to go high and 143 to go low. Similarly, the low output of gate 131 causes the output of gate 140 to go high and the output of gate 139 to go low. The high input from gate 140 generates an enabling signal for gate 141 which in the presence of a high output from gate 138 corresponding to the advent of bipolar pulses generates a low output from gate 141. This low output causes the output of gate 143 to go high and the gate of 144 to go low. Thus, in this condition, the outputs of gates 143 and 144 form a square wave whose frequency corresponds to the rate of reversal of negative trios and bipolar pulses.

In summary, it can be said that the output of gates 143 and 144 form a square wave whose frequency corresponds to the rate of pattern reversal. The output of gate 143 goes high whenever there is a transition from either negative trios or bipolar patterns to positive trios or from negative trios to bipolar patterns. Similarly, the output of gate 144 goes high whenever there is a transition from either bipolar patterns or positive trios to negative trios, or from positive trios to bipolar patterns.

The leading edge of the positive going signals from gates 143 and 144 are detected by differentiators 145 and 146 respectively. These differentiators can be implemented by various means known to the art and therefore have not been shown in detail. Suffice it to say, that in response to the leading edge of a positive pulse, the differentiator generates a very narrow positive going output pulse. These narrow pulses form the inputs to NOR gate 147, which thereby generates a very narrow low going pulse whenever the cross coupled latch formed by gates 143 and 144 changes state. This brief pulse is used to reset four stage binary counter 148, thereby allowing it to begin counting. It is seen that the clock input for counter 148 is provided by the clock extraction circuit 152. It is further seen that the B and D outputs of counter 148 in conjunction with the normally high output from gate 147 are combined in NAND gate 149. The output of NAND gate 149 therefore goes high whenever counter 148 is in its counting mode. It is further seen that when the counter reaches the count of 10 the B and D outputs go high and also that the output from 147 has gone high thereby causing the output of gate 149 to go low. This imposes a logic 0 on the set input of counter 148 locking it into its set state. Thus it is seen that at each transition of the cross coupled latch formed by gates 143 and 144, counter 148 is reset for a period of time corresponding to 10 clock pulses. During this period, the output of gate 149 is maintained in a high condition. This condition is used to generate a train of ten consecutive 0's or 10 consecutive 1's in the output. It is seen that the output of gate 149 is coupled to one input of NAND gate 150 and one input of NAND gate 151. The second input to NAND gate 151 is derived from the output of NAND gate 143. Assuming that the test pulse pattern has just reversed causing the output of gate 143 to go high, a logic 1 is imposed on the corresponding input of gate 151. In addition, this transition will cause a narrow pulse from differentiator 145 to reset counter 148 which in turn holds the output of gate 149 high for a period determined by 10 clock pulses. These two high signals combined in gate 151 cause the output of that gate to go low, thereby preventing gate 110 from passing any input pulses received from gate 109. Thus the output of gate 110 is maintained in a high condition for a period determined by 10 clock pulses. This maintains the $\overline{Q}$ output of flip flop 111 in a low condition for that same period. The output circuitry described above then uses this continual low Q output from flip flop 111 to generate a string of 10 consecutive bipolar logic 1's in the output of transformer 121. The above described action takes place every time the output of gate 143 is driven high in response to a test pattern reversal from either bipolar patterns or negative trios to positive trios or from negative trios to bipolar patterns.

The circuit operates in a similar manner whenever the output of gate 144 is driven high in response to a pattern reversal from either bipolar patterns or positive trios to negative trios or from positive trios to bipolar patterns. As described above, counter 148 is reset for a period determined by 10 clock pulses. This, in conjunction with the high output from gate 144, maintains the output of gate 150 in a low condition. In a similar manner, the low output from gate 143 maintains the output of gate 151 in a high condition. The low output from gate 150 maintains the output of gate 109 in a high condition, which when combined with a high output from gate 151, maintains the output of gate 110 in a low condition. This causes the $\overline{Q}$ output of flip flop 111 to remain high for a period determined by 10 clock pulses. When processed through the output circuitry described above, the continual high signal causes a string of 10 consecutive logic 0's to appear on the secondary of transformer 121.

In summary it can be said that the output signal of the encoder possesses the following characteristics: (a) it is truly bipolar and therefore will have no output on the fault winding of any repeater which regenerates it; (b) it retains trio and bipolar information of the original signal as the trio pattern has three consecutive ones and bipolar has two; (c) overwritten on this output pattern are 10 consecutive 1's every time there is a transition to positive trios from either negative trios or bipolar patterns or from negative trios to bipolar patterns. Also overwritten on this output pattern are 10 consecutive 0's whenever there is a transition to negative trios from either positive trios or bipolar patterns or from positive trios to bipolar patterns. This information is sufficient to allow the decoder, described below, to reconstruct the original test signal.

Figure 5:
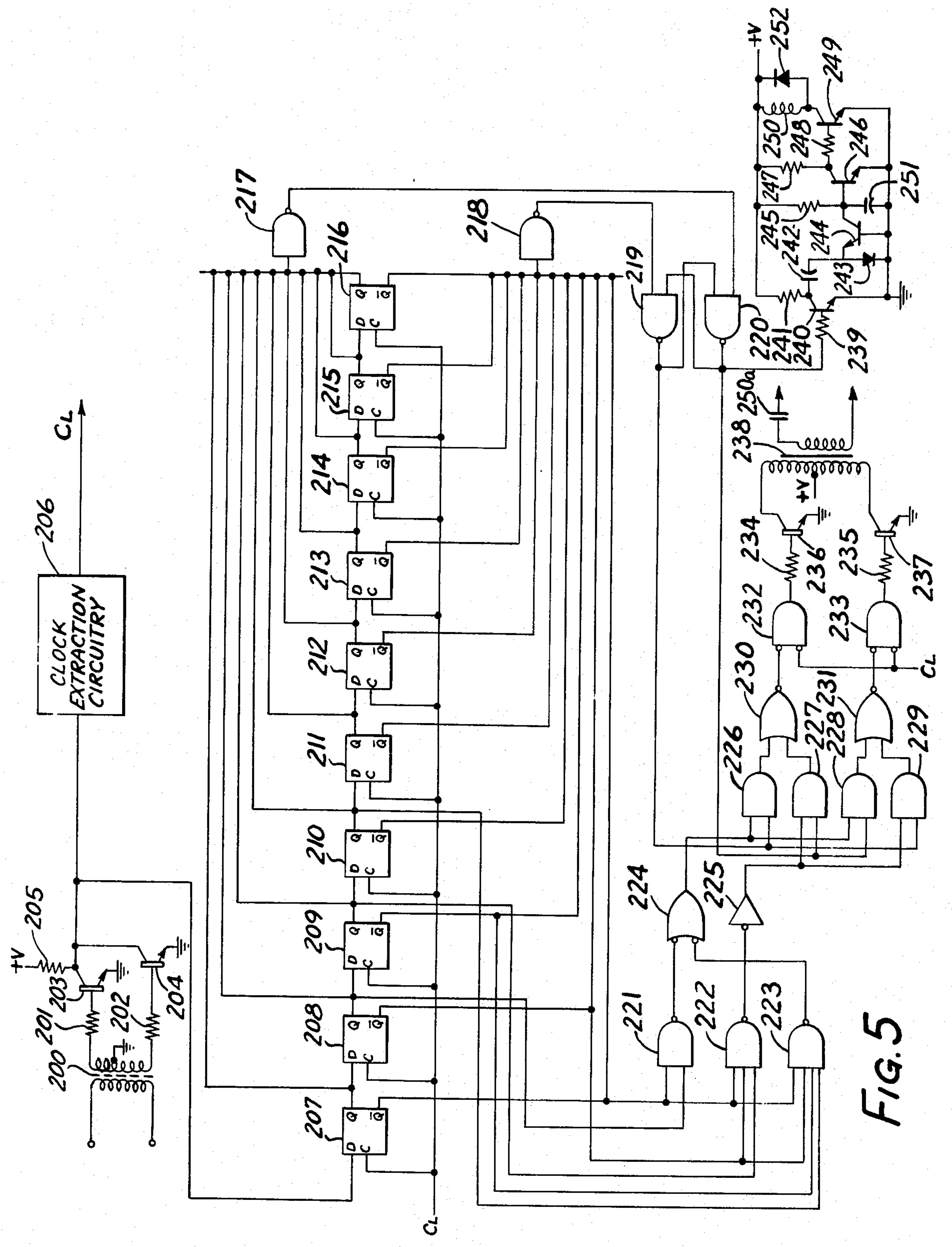
FIG. 5 is a logic diagram for the decoder circuitry.

Referring now to FIG. 5, the input to the decoder circuit is provided by transformer 200, whose primary is coupled across the transmit line. In a similar manner to the encoder circuit, the input stage is provided with a center tapped secondary with transistors 203 and 204 coupled to the respective ends via resistors 201 and 202. A positive input pulse on the transformer primary will turn on transistor 203 while a negative pulse will turn on transistor 204. The collectors of these transistors are commoned and provided through resistor 205 with a suitable positive supply of DC voltage. Thus, the junction formed at the collectors of transistors 203 and 204 will be driven low whenever a logic 1, either positive or negative, is received and will remain high whenever logic 0's are received. The decoder is also provided with a clock extraction circuit 206, identical to that of the encoder circuitry, which provides clock pulses for use in the decoder. The unipolar pulse train provided by transistors 203 and 204 is coupled to the input of a 10 stage shift register defined by flip flops 207 through 216. The clock signal provided by clock extraction circuitry 206 is provided to each flip flop stage in the shift register. The D input of each flip flop except for the first is coupled to the Q output of the preceding stage. Therefore, a right shift register is formed similar to the four stage registers described in the encoder circuitry. The presence of an input pulse and its position in the pulse train is indicated by a logic 1 on a corresponding $\overline{Q}$ output of the shift register. Ten input NAND gates 217 and 218 are used to monitor the state of the shift register to detect the occurrence of pattern reversals. It is recalled that each time the encoder circuitry detected a transition to positive trios or from negative trios it overwrote on its output signal a string of 10 logic 1's. Gate 218 is provided to sample the $\overline{Q}$ output of each stage in the shift register. When 10 consecutive 1's appear at the input to transformer 200 they will be loaded into the register and ultimately result in all $\overline{Q}$ outputs going high. This will cause the output of gate 218 to go low, which when applied to the input of the cross coupled latch formed by NAND gates 219 and 220 will cause the output of gate 219 to go high and 220 to go low. Similarly, 10 input NAND gate 217, which monitors all Q outputs of the shift register, detects the presence of 10 consecutive 0's. On the occurrence of 10 consecutive 0's the output of gate 217 goes low causing the output of gate 220 to go high and 219 to go low. Therefore, it is seen that NAND gates 219 and 220 form a cross coupled latch which has a square wave output whose frequency corresponds to the rate of pattern reversal. The output of NAND gate 219 will be driven high whenever there is a transition to positive trios from either negative trios or bipolar patterns or to bipolar patterns from negative trios. Similarly, the output of NAND gate 220 will be driven high whenever there is a transition to negative trios from either positive trios or bipolar patterns or to bipolar patterns from positive trios. It is seen that the circuitry described thus far has detected the pattern reversal rate. Circuitry to be described below is used to detect the presence of trios or bipolar patterns.

This function is accomplished by gates 221 through 225. It is seen that these gates are used to monitor the first four stages of the ten stage register. Gates 221 through 223 are respectively two, three and four input NAND gates which sense respectively the first, second and third pulses in a pattern. In addition to monitoring the Q output of flip flop 208, NAND gate 221 monitors the $\overline{Q}$ output of flip flop 207. Thus NAND gate 221 provides a low output whenever a first pulse of any pattern is detected. In like manner, NAND gate 222 monitors the Q output of flip flop 209 and the $\overline{Q}$ outputs of flip flop 207 and 208. It thereby detects the second pulse in any pulse pattern. Gate 223, in addition to monitoring the Q output of flip flop 210, monitors the $\overline{Q}$ outputs of flip flops 207, 208 and 209. It thereby detects the presence of a third pulse in the pattern if that third pulse is present. NAND gate 224 combines the outputs of NAND gates 221 and 223 and thereby generates a high signal in the presence of a first or third pulse. Inverter 225 is coupled to the output of NAND gate 222 and thereby generates a high signal in the presence of a second pulse in a pattern.

Gates 226 through 231 are used to reconstruct the original test signals. One input of AND gates 226 and 229 are coupled to the output of gate 219, while one input of AND gates 227 and 228 are coupled to the output of gate 220. It is recalled that the output of gate 219 is driven high when the coded signal indicates a transistion to positive trios or from negative trios by the presence of 10 consecutive 1's. It is further recalled that during this condition, the output of gate 220 is low. Therefore in this condition gates 226 and 229 are enabled while gates 227 and 228 are disabled. It is seen that the second input to gate 226 is provided by gate 224 which generates a high signal in the presence of the first and third pulses. It is also seen that the second input of gate 229 is provided by inverter 225 which generates a high signal in the presence of a second pulse in a pattern. Reconstruction of a usable test signal then occurs as follows. Assume that the output of gate 219 is driven high due to a pattern reversal to positive trios. The first pulse in a pattern detected by gate 221 as described above, appears as a positive input to AND gate 226. Its corresponding output is driven high which results in a low signal at the output of NOR gate 230. This low signal is retimed with the clock as shown in NOR gate 232, driving its corresponding output high. This high signal causes transistor 236 to conduct, drawing current from the center tapped primary of transformer 238. This results in a positive pulse at the output of transformer 238. When NAND gate 222 detects the second pulse it results in a positive signal at the output of inverter 225, which is imposed on the input of AND gate 229. This causes the output of NOR gate 231 to go low; this low signal is retimed by the clock as shown in NOR gate 233, causing transistor 237 to turn on and draw current in the opposite direction through the primary of transformer 238, causing a negative pulse to appear at the output of that transformer. When the third pulse in the pattern is detected by NAND gate 223, it is routed as the first pulse through NAND gate 224, AND gate 226, NOR gate 230, NOR gate 232 and transistor 236 to cause a positive pulse to appear in the output. Succeeding patterns of three pulses are detected in like manner, thereby regenerating the original positive trio pattern with its attendant bipolar violations yielding a test signal in directly usable form.

The circuitry operates in a similar manner if the output of gate 219 were driven high in response to a pattern reversal from negative trios to bipolar patterns. However no third pulse would be available in the patterns received, gate 223 would not be enabled and groups of two pulses would be generated in the transformer output.

If the output NAND gate 220 is driven high due to the fact that the circuitry has detected a transition to negative trios by the presence of 10 consecutive 0's, AND gates 227 and 228 are enabled while gates 226 and 229 are disabled. It is seen that this condition will route first and third pulses through NAND gate 224, AND gate 228, NOR gate 231, and NOR gate 223 to transistor 237, thereby causing the first and third pulses to be negative. Similarly the second pulse is routed through inverter 225, AND gate 227, NOR gate 230, NOR gate 232 and transistor 236, thereby causing the second pulse to be of positive polarity. It is therefore seen that a negative trio has been reconstructed. In addition, bipolar pulses are generated in the same manner merely eliminating the third pulse.

It should be appreciated from the foregoing that what has been accomplished is the reconstruction of the original test signal. It is realized that the presence of 10 1's or 10 0's overwritten on the coded signal causes a slight abberration in the reconstructed signal near these pattern reversals. However, as the pulse repetition rate is very high as compared to the audio frequency of pattern reversals, this aberration has little effect on the usability of the test signal.

The final function of the decoder is to couple the output signal described above onto the receive line whenever a coded signal is recognized while assuring that the decoder has no effect on the receive line during normal transmission. It is recalled that during normal transmission, while the probability of detecting 10 consecutive 1's is relatively high, the probability of detecting 10 consecutive 0's is extremely small. When coded signals are imposed on the transmit line, the appearance of 10 consecutive 1's and 10 consecutive 0's alternates at an audio rate. Therefore it is seen that the cross coupled latch formed by NAND gate 219 and 220 toggles at a very low rate during normal transmission but at an audio rate during coded signal transmission. The output of this latch is monitored by a threshold circuit which energizes a relay driver to couple the decoder output to the receive line whenever the reversal rate is high enough to indicate the receipt of coded signals.

As shown in FIG. 5 the output of NAND gate 220 is coupled through resistor 239 to the base of transistor 240. The collector of this transistor, which is coupled to a suitable supply of DC voltage through resistor 241, is driven low whenever the output of gate 220 is driven high by the detection of 10 consecutive 0's. Similarly, the collector of transistor 240 goes high whenever the output of gate 220 goes low due to the detection of 10 consecutive 1's. A positive transition of the collector of transistor 240 charges capacitor 242 through diode 243. A negative transition discharges the capacitor through the base-emitter junction of transistor 244. This causes current flow through resistor 245 and the collector-emitter circuit of transistor 244. It is seen that resistor 245 also supplies current to the base of transistor 246 maintaining its collector, which is connected through resistor 247 to a suitable supply of DC voltage, at a low level. This further prevents current flow through resistor 248 to transistor 249 preventing current flow through relay coil 250 maintaining relay contacts 250*a* open. However when the toggle rate of the latch formed by gates 219 and 220 increases, transistor 240 is turned on and off at a higher rate. This further causes transistor 244 to turn on and off at a higher rate increasing the average DC collector current of transistor 244. Eventually the voltage present at the base of transistor 246 will decrease to a point where transistor 246 can no longer conduct, due to the voltage dropped across resistor 245 by the current drawn by transistor 244. This causes current flow through resistors 247 and 248 to the base of transistor 249 resulting in current flow through relay coil 250, closing contacts 250*a* and imposing the output signal of transformer 238 onto the receive line. Capacitor 251 is used to smooth the signal to the base of transistor 246. Diode 252 is used to suppress transients from relay coil 250. The value of resistor 245 is selected such that relay 250 will remain open during normal tranmission but will close when coded test signals are received.

The combined operation of the encoder and decoder will be described with reference to FIG. 6. There are diagrammatically illustrated waveforms at five points: diagram 300 respresents the output signal form the signal generator, 301 illustrates the unipolar signal at the output of gate 108 in the encoder, 302 illustrates the output signal of the encoder, 303 illustrates the unipolar signal at the input to flip flop 207 of the decoder and 304 illustrates the output signal of the decoder. For ease of illustration, the pulses are shown as simple vertical lines; however they represent waveforms as shown on FIG. 2.

Initially it should be noted that diagram 302 illustrates a pulse train which is truly bipolar, i.e. successive pulses alternate in polarity. As no bipolar violations are present, this can be passed down the transmit line without causing any repeater in the transmit line to affect the fault pair. It is seen that the signal from the test set is a group of six positive trios 305 followed in order by a group of six negative trios 306, a second group of six positive trios 307, and a group of six bipolar patterns 308. Diagram 301 shows a group of three unipolar pulses for every trio and a group of two unipolar pulses for each bipolar pattern. The output signal 302 is a combination of the unipolar pulse train 301 and the transition signal generated in response to pattern reversals. It is recalled that this transition signal is a string of 10 consecutive 1's for a transition to positive trios or from negative trios or a group of 10 consecutive 0's for a transition to negative trios or from positive trios. Pulses 309 illustrate the first trio pattern sent in response to receipt of the initial trio from the test set. They are immediately followed by a series of 10 bipolar 1's illustrated as 310 which indicate the transition to positive trios. The unipolar input to flip flop 207 in the decoder is illustrated at 303, which shows the initial three pulses corresponding to the trio followed by 10 pulses corresponding to the 10 consecutive 1's. The response of the decoder is shown at 311; it should be noted that the first trio illustrated at 311 could be either a positive or negative trio, depending on the existing state of the bistable latch formed of NAND gates 219 and 220. It is further seen that the decoder is prevented from outputting any pulses during the period of receipt of the 10 consecutive 1's. However, thereafter each trio output by the decoder corresponds to a trio input to the encoder from the test set. It is further seen that the polarity of alternate trios is reversed by the encoder so as to provide a true bipolar signal; however the operation of the decoder as described above permits the decoder to reconstruct the original trios with their inherent bipolar violations.

The first negative trio received from the test set is illustrated at 312. It should be appreciated that the flip flop within the decoder circuitry which detects pulse pattern types has not yet been reset; therefore this first trio will be decoded as a positive trio as illustrated at 313. However the encoder having recognized the transition to negative trios, emits a string of 10 consecutive 0's illustrated as 314. This resets the flip flop in the decoder circuitry indicating that further patterns will be negative trios. The first negative trio reproduced is illustrated at 315. It is seen that succeeding negative trios are all reproduced in response to the encoded truly bipolar signal. Thereafter the transition back to positive trios is illustrated at 316. It is seen that the pattern indicating flip flop has not been reset and therefore positive trio 316 is reproduced as a negative trio 317. Thereafter is seen a pattern of 10 consecutive bipolar 1's which reset the pattern indicating flip flop in the decoder but prevent it from outputtting pulses in response to the 10 consecutive 1's.

Following this all positive trios from the test set are reproduced by the decoder as positive trios as shown. The transition from positive trios to bipolar pulses is illustrated at 319. It is seen that in response to these bipolar pulses both encoder unipolar pulse train 301 and decoder unipolar pulse train 303 contain groups of two pulses. After the first bipolar pattern 312 is transmitted by the encoder, the encoder circuitry overwrites 10 consecutive 0's on the output pulse train shown at 320. After this string of 10 0's the encoder encodes and the decoder accurately reproduces each bipolar pattern.

Figure 6:
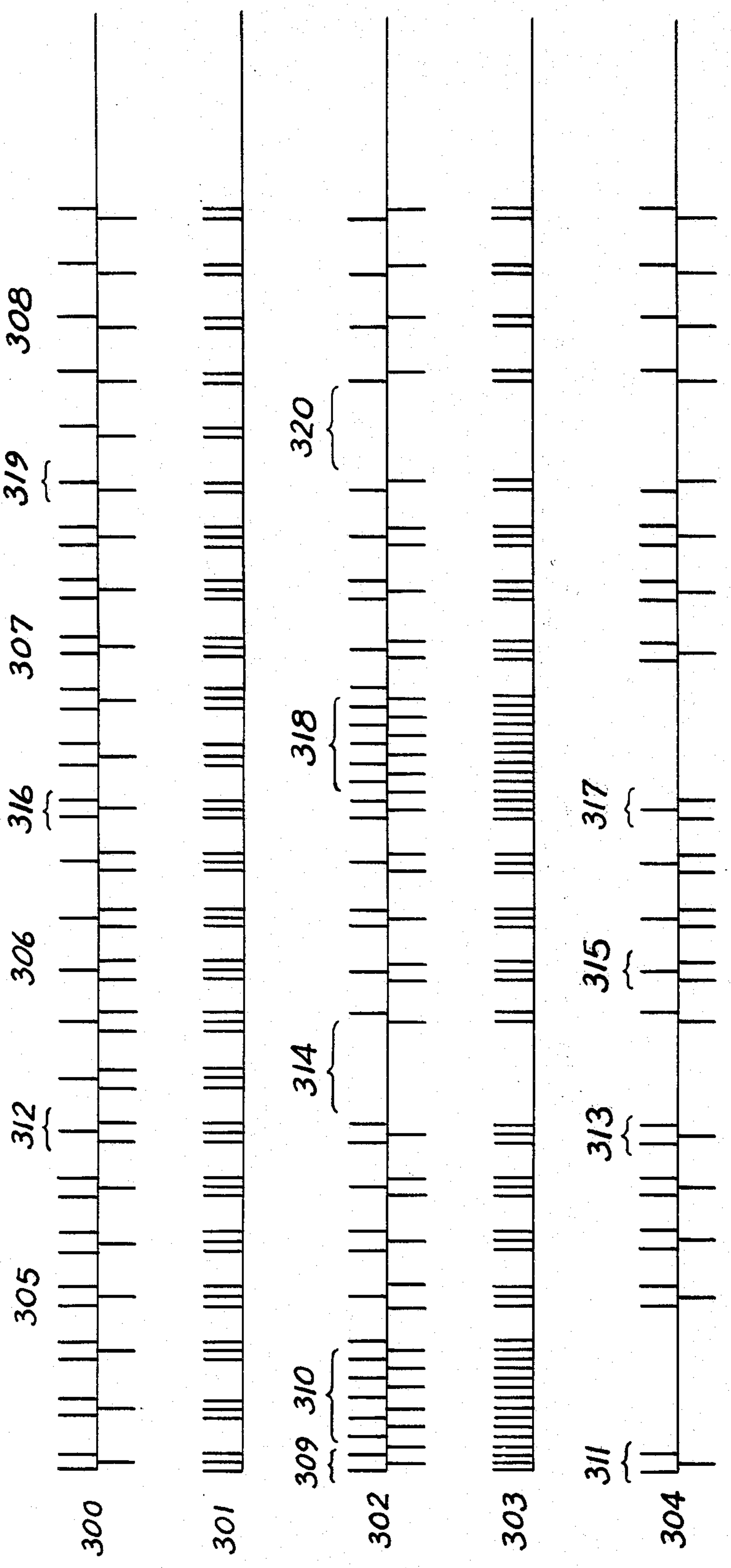
FIG. 6 is a timing diagram illustrating various encoder and decoder waveforms.

FIG. 6 is intended to illustrate the reaction of the circuitry to pattern transitions and therefore dwells unduly on the output signal aberrations. However, it should be noted that in normal operation trains of trio or bipolar patterns transmitted before a reversal depends both on the reversal frequency and trio density. It would be very unusual to transmit less than fifty patterns before a reversal.

The details of the circuit description given above should not have masked the overall purpose and function of the circuitry. What has been achieved is an effective doubling of the testing capability of a single pair of fault lines. This is accomplished by isolating the transmit and receive lines during testing while still utilizing the transmit line to pass a test signal which will be usable in testing the receive span. The switched amplifier has been modified by limiting the amount of power drawn to make it compatible with the expanded system. In addition, the unusual way of coupling the switched amplifier to the fault circuits of the repeaters, i.e. with half the switched amplifiers coupled to the transmit and the other half to the receive span in response to the polarity of the voltage applied to the fault pair have in combination with the above circuitry yielded a remote test system with greater capabilities than those presently available. It should also be apparent that the encoder and decoder can be utilized without switched amplifiers in relatively short lines to allow independent testing of 12 transmit and 12 receive repeaters.

At several points in the above description, specific examples have been given relating to the testing system disclosed in a T-1 carrier telephone system. However, it should be realized that the system is not limited to use therein. Indeed, the system is of general applicability for bipolar digital transmission systems utilizing repeaters. Therefore, it should be appreciated that while the system has been limited in the above description to testing 48 repeaters half in the transmit and half in the receive line, this limitation is imposed by the 12 bandpass filter frequencies available in a T-1 system; in other transmission system, if a greater number of bandpass filter frequencies are available the system can be further expanded. In addition the indirect means of testing described above can further expand the system.

It should be further realized that the encoder and decoder have been described with reference to one very specific preferred embodiment. However, there are numerous circuit configurations usable to perform the same functions. For example, transitions in the test pulse patterns could be indicated by a string of consecutive pulses whose number is other than 10 or by other unusual pulse patterns. However, these and other mere mechanical changes are intended to fall within the spirit and scope of the appended claims.

We claim:

1. In a communications system the combination comprising a central station, a remote station a transmit line extending from the central station to the remote station, a receive line extending from the remote station to the central station, two transmit sets of repeaters serially connected in the transmit line at spaced positions, two receive sets of repeaters serially connected in the receive line at spaced positions, means including a test signal generator at the central station for selectively generating a predetermined limited number of test signals and for applying the test signals to the transmit line, the test signals being in the form of bipolar pulse trains having bipolar violations therein for imparting respective frequency characteristics to said test signal, a fault line extending from all of the repeaters to the central station, each set of repeaters being respectively connected to the fault line via a corresponding set of band pass filters tailored to pass respective ones of the frequency characteristics, means at the central station for applying a "set selector" signal to the fault line and including responsive means at the repeaters for enabling the repeater sets in the respective lines to respond separately to the test signals thereby doubling the number of repeaters which can be tested with the same set of test signals, a test signal encoding device at the central station interposable between the test signal generator means and the transmit line including pulse polarity reversal means for removing said bipolar violations and encoding the test signals into a disguised form free of said frequency characteristics, and a test signal decoding device at the remote station interposable between the transmit line and the receive line for reconverting the encoded test signals into test signals of directly usable form including said bipolar violations and the respective frequency characteristics imparted thereby, so that by interposition of the encoder and decoder a total number of repeaters can be tested using the same fault line which is four times as great as the available number of test signals.

2. The combination as claimed in claim 1 in which the set selector signal applied at the central station to the fault line is in the form of a D.C. polarity.

3. In a communications system the combination comprising a central station, a remote station, a transmit line extending from the central station to the remote station, a receive line extending from the remote station to the central station, a transmit set of repeaters serially connected in the transmit line, a receive set of repeaters serially connected in the receive line, a test signal generator at the central station for selectively generating a predetermined limited number of test signals in directly usable form and for applying said test signals to the transmit line, said test signals being in the form of a series of pulses having periodic bipolar violations for imparting respective frequency characteristics to said test signals, encoding means interposable between the test signal generator and the transmit line and including pulse polarity reversal means for removing said bipolar violations and encoding said test signals into disguised form consisting of a series of pulses free of said frequency characteristics, a fault line leading from the repeaters to the central station, a set of band pass filters tailored to pass respective ones of the frequency characteristics, each band pass filter being interposed between the output side of a transmit and receive repeater and the fault line so that each transmit repeater may be tested by the test signals which are in directly usable form, a test signal decoder at the remote station responsive to the receipt of the test signals in coded form for decoding such test signals and for applying the decoded signals including the bipolar violations and the frequency characteristics imparted thereby to the receive line for separate testing of the repeaters in the receive line.

4. The combination as claimed in claim 3 in which the directly usable test signal consists of a patterned series of pulses in which the positive pulses predominate followed by a patterned series of equal duration in which the negative pulses predominate, the two series being sent repetitively to produce a sensible frequency which corresponds to the repetition rate.

5. The combination as claimed in claim 4 in which one series of pulses is made up of positive pulse trios having two positive pulses and one negative pulse and in which the succeeding series is made up of negative pulse trios formed of two negative pulses and one positive pulse.

6. The combination as claimed in claim 5 in which the number of trios of given polarity in each series is progressively increased while maintaining the same series repetition rate, the number of trios which can be accommodated before breakdown serving as a figure of merit for each repeater.

7. The combination as claimed in claim 4 in which means are provided for encoding the test signal as a train of bipolar pulses devoid of any characteristic frequency within the pass bands of the filters.

8. The combination as claimed in claim 3 in which the directly usable test signal consists of a train of pulses in which pulses of one polarity predominate in a repetitive pattern at a characteristic frequency.

9. In a communications system the combination comprising a central station, a remote station, a transmit line extending from the central station to the remote station, a receive line extending from the remote station to the central station, a transmit set of repeaters serially connected in the transmit line at spaced positions, a receive set of repeaters serially connected in the receive line at correspondingly spaced positions, means including a test signal generator at the central station for selectively generating test signals in directly usable form and for applying the test signals to the transmit line, the test signals being in the form of pulse trains including trios and duos alternating to impart resepctive frequency characteristics to said test signal, a fault line extending from all of the repeaters to the central station, a set of band pass filters constructed to pass respective ones of the frequency characteristics with individual band pass filters being coupled between the output sides of corresponding ones of the spaced repeaters and the fault line, a test signal encoding device at the central station interposable between the test signal generator and the transmit line for encoding the test signals including said trios and duos into a disguised form free of said frequency characteristics, a test signal decoding device at the remote station connected between the transmit line and the receive line, the decoding device serving to reconvert the coded test signals into test signals of directly usable form including said trios and duos and having the respective frequency characteristics so that the same test signal generator means can be used for testing of the transmit repeaters and, by interposition of the encoder device, for testing of the receive repeaters.

10. The combination as claimed in claim 9 in which an additional set of transmit and receive repeaters are serially connected at spaced positions in the transmit and receive lines respectively and a corresponding set of band pass filters are connected to the same fault line, and means are provided including switches operated by a signal applied to the fault line at the central station for selectively actuating the sets of band pass filters for response to a test signal.

11. In a communications system the combination comprising a central station, a remote station, a transmit line extending from the central station to the remote station, a receive line extending from the remote station to the central station, a transmit set of repeaters serially connected in the transmit line, a receive set of repeaters serially connected in the receive line, means including a test signal generator at the central station for selectively generating test signals in directly usable form and for applying the test signals to the transmit line, the test signals being in the form of pulse trains including a plurality of pulse pattern types with the pattern types alternating to impart respective frequency characteristics to said test signal, a fault line extending from the repeaters to the central station, a set of band pass filters respectively coupled between the output sides of the repeaters and the fault line, the band pass filters being tailored to pass respective ones of the frequency characteristics to the fault line for individual testing of the transmit repeaters by the test signals, a test signal encoding device at the central station interposable between the test signal generator and the transmit line for selectively converting the test signals into pulse trains having no sensible frequency characteristic, said test signal encoding device including means for generating a transition signal in response to transitions between said pattern types in said test signal, a test signal decoding device at the remote station interposable between the transmit line and the receive line and responsive to said transition signal for converting the coded test signals back into test signals of directly usable form having the respective frequency characteristics for separate testing of the repeaters in the receive line.

12. In a communications system the combination comprising a central station, a remote station, a transmit line extending from the central station to the remote station, a receive line extending from the remote station to the central station, a transmit set of repeaters serially connected in the transmit line at spaced positions, a receive set of repeaters serially connected in the receive line at spaced positions, means including a test signal generator at the central station for selectively generating a predetermined limited number of test signals in directly usable form and for applying the test signals to the transmit line, the test signals being in the form of bipolar pulse trains having periodic bipolar violations for imparting respective frequency characteristics to said test signal, a fault line extending from all of the repeaters to the central station, a set of band band pass constructed to pass respective ones of the frequency characteristics and respectively connected between the output sides of the repeaters and the fault line, a test signal encoding device at the central station interposable between the test signal generator means and the transmit line and including pulse polarity reversal means for removing said bipolar violations and encoding the test signals into disguised form consisting of trains of bipolar pulses free of the respective frequency characteristics, a test signal decoding device at the remote station for restoring the disguised test signals into a directly usable form including said bipolar violations and having the respective frequency characteristics, and means including a switch associated with the decoding device responsive to the arrival of an encoded pulse train for connecting the output of the decoding device to the receive line for testing of the repeaters in the receive line.

13. The combination as claimed in claim 12 in which the initial portion of the encoded pulse train includes an encoded switching instruction and in which the switching means includes means for responding to the switching instruction.

14. In a communications system the combination comprising a central station, a remote station, a transmit line extending from the central station to the remote station and a receive line extending from the remote station to the central station, a transmit set of repeaters serially connected in the transmit line at spaced positions, a receive set of repeaters serially connected at the receive line at spaced positions, means including a test signal generator for selectively generating predetermined limited number of test signals in the form of pulse trains including trios and duos and having respective frequency characteristics in a form directly usable for testing the repeaters in the transmit line, a fault line extending from the repeaters to the central station, a set of band pass filters respectively connected between the output sides of the repeaters and the fault line, the band pass filters being tailored to pass respective ones of the frequency characteristics to the fault line for detection at the central station, the number of repeaters in the transmit set exceeding the number of test signals so that at least two of the transmit repeaters are associated with band pass filters which are duplicatedly responsive to the same frequency characteristic, means in the central station for selectively applying an enabling signal to the fault line, and means including a switch associated with the duplicated band pass filters and responsive to the enabling signal for coupling a selected one of such duplicated filters to the fault line, a test signal encoding device at the central station coupled to the test signal generating means for encoding the test signals into a disguised form free of said frequency characteristics, and a test signal decoding device at the remote station for receiving the disguised test signals and reconverting them back into directly usable form including said trios and duos for application to the receive line for testing of the repeaters in the receive line.

15. In a communications system the combination comprising, a central station, a remote station, a transmit line extending from the central station to the remote station, a receive line extending from the remote station to the central station, a transmit set of repeaters serially connected in the transmit line, a receive set of repeaters serially connected in the receive line, means including a test signal generator at the central station for generating test signals in directly usable form and for applying the test signals to the transmit line for testing of the transmit repeaters, the test signals being in the form of bipolar pulse trains having a plurality of pulse pattern types at least one of such pattern types containing bipolar violations, the pattern types alternating at rates which impart respective frequency characteristics to the test signal, a test signal encoding device at the central station interposable between the test signal generator and the transmit line for selectively converting the test signals into coded pulse trains having no bipolar violations, the encoding device including input means for converting the bipolar test signals to unipolar signals, detection means for detecting each of the plurality of pulse types and generating a transition signal in response to changes in the test signal between pattern types, gating means for combining the unipolar signal and the transition signal, clock means for retiming the combined signal, and output means for converting the retimed signal to true bipolar form free of bipolar violations, a test signal decoding device at the remote station interposed between the transmit line and the receive line, the decoding device including input means for converting the coded signals to a unipolar signal, a register for temporarily storing the unipolar signal, gating means for monitoring the condition of the register to detect coded transition signals and pulse patterns, outupt means responsive to the gating means for generating an output signal containing bipolar violations substantially corresponding to the test signal originally encoded, and coupling means responsive to receipt of the coded signal for coupling the output signal onto the receive line for separate testing of the repeaters in the receive line.

16. The combination as claimed in claim 15 in which the pulse pattern types are positive trios having two positive pulses and one negative pulse, negative trios having two negative pulses and one positive pulse and bipolar patterns having one positive pulse and one negative pulse.

17. The combination as claimed in claim 15 in which a fault line extends from the repeaters to the central station and a set of band pass filters is respectively coupled between the output sides of the repeaters and the fault line, the band pass filters being tailored to pass respective ones of the frequency characteristics to the fault line for individual testing of the repeaters by the test signals.

18. The combination as claimed in claim 17 in which an additional set of transmit and receive repeaters are serially connected at spaced positions in the transmit and receive lines respectively and a corresponding set of band pass filters are connected to the same fault line, and means are provided including switches operated by a signal applied to the fault line at the central station for selectively actuating the sets of band pass filters for response to a test signal.

* * * * *